(12) United States Patent
Aarni et al.

(10) Patent No.: US 8,204,800 B2
(45) Date of Patent: Jun. 19, 2012

(54) METHOD AND APPARATUS FOR DISPLAYING PURCHASING INFORMATION ON A MOBILE DEVICE

(75) Inventors: Ville Aarni, Veikkola (FI); Miikka Sainio, Kerava (FI); Niklas Von Knorring, Helsinki (FI); Dmitry Kolesnikov, Vantaa (FI); Atte Lahtiranta, Bedford, MA (US)

(73) Assignee: Nokia Corporation, Espoo (FI)

( * ) Notice: Subject to any disclaimer, the term of this patent is extended or adjusted under 35 U.S.C. 154(b) by 198 days.

(21) Appl. No.: 12/468,800

(22) Filed: May 19, 2009

(65) Prior Publication Data

US 2010/0299225 A1 Nov. 25, 2010

(51) Int. Cl.
 *G06Q 30/00* (2012.01)
(52) U.S. Cl. ........ 705/27.1; 705/27.2; 705/16; 705/26.1
(58) Field of Classification Search .................. 705/27.1, 705/27.2, 26.1, 16
 See application file for complete search history.

(56) References Cited

U.S. PATENT DOCUMENTS

| | | | |
|---|---|---|---|
| 6,487,540 B1 | 11/2002 | Smith et al. |
| 6,577,861 B2 | 6/2003 | Ogasawara |
| 7,072,854 B2 | 7/2006 | Loeser |
| 7,190,949 B2 | 3/2007 | Tsuda et al. |
| 7,240,832 B2 | 7/2007 | Bendeck et al. |
| 2002/0046153 A1 | 4/2002 | Piggins |

FOREIGN PATENT DOCUMENTS

WO WO 2008/051488 A1 5/2008

OTHER PUBLICATIONS

International search report and written opinion for corresponding international application No. PCT/FI2010/050386 dated Aug. 26, 2010, pp. 1-7.

*Primary Examiner* — Ramsey Refai
(74) *Attorney, Agent, or Firm* — Ditthavong Mori & Steiner, P.C.

(57) ABSTRACT

An approach is provided for displaying purchasing information on a mobile device. Purchasing information that is transmitted for display using a purchasing application on the mobile device is redirected for display on a browser application or a messaging application when the purchasing application is not resident on the mobile device.

18 Claims, 8 Drawing Sheets

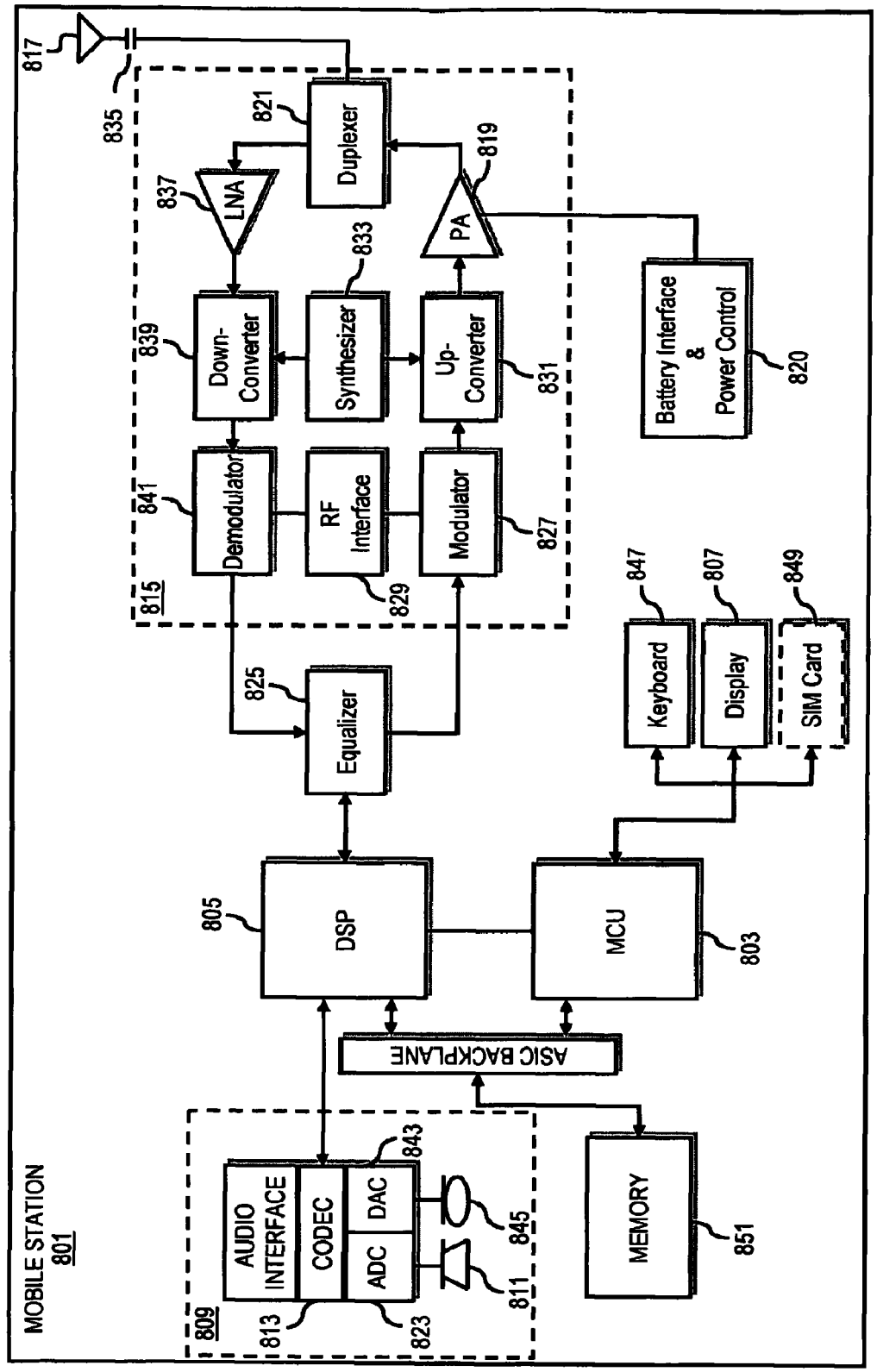

METHOD AND APPARATUS FOR DISPLAYING PURCHASING INFORMATION ON A MOBILE DEVICE

BACKGROUND

Wireless (e.g., cellular) service providers and device manufacturers are continually challenged to deliver value and convenience to consumers by, for example, providing compelling network services. One area of development has been the use of mobile devices for online commerce. To interact with online commerce services, a user generally has to browse a catalog and provide at least some information (e.g., user login information such as a user identification and password, payment information for online commerce services, personal information for registering with certain services, etc.). On a mobile device, the task of browsing and/or providing information for purchasing items can be cumbersome and potentially inconvenient to the user, particularly if the device has a small display and limited processing capability.

SOME EXAMPLE EMBODIMENTS

Therefore, there is a need for an approach for quickly and conveniently displaying purchasing information.

According to one embodiment, a method comprises initiating transmission of purchasing information to be presented on a mobile device. The method also comprises determining whether a purchasing application is resident on the mobile device. The method further comprises redirecting the purchasing information to a browser application or a messaging application on the mobile device based on the determination of whether the purchasing application is resident on the mobile device.

According to another embodiment, an apparatus comprising at least one processor, and at least one memory including computer program code, the at least one memory and the computer program code configured to, with the at least one processor, cause the apparatus to initiate transmission of purchasing information to be presented on a mobile device. The apparatus is also caused to determine whether a purchasing application is resident on the mobile device. The apparatus is further caused to redirect the purchasing information to a browser application or a messaging application on the mobile device based on the determination of whether the purchasing application is resident on the mobile device.

According to another embodiment, a computer-readable storage medium carrying one or more sequences of one or more instructions which, when executed by one or more processors, cause an apparatus to initiate transmission of purchasing information to be presented on a mobile device. The apparatus is also caused to determine whether a purchasing application is resident on the mobile device. The apparatus is further caused to redirect the purchasing information to a browser application or a messaging application on the mobile device based on the determination of whether the purchasing application is resident on the mobile device.

According to another embodiment, an apparatus comprises means for initiating transmission of purchasing information to be presented on a mobile device. The apparatus also comprises means for determining whether a purchasing application is resident on the mobile device. The apparatus further comprises means for redirecting the purchasing information to a browser application or a messaging application on the mobile device based on the determination of whether the purchasing application is resident on the mobile device.

According to another embodiment, a method comprises receiving purchasing information. The method also comprises directing a browser application to a script associated with the purchasing information that is used to determine whether a purchasing application is resident and to redirect the purchasing information to the browser application or a messaging application based on the determination.

According to another embodiment, an apparatus comprising at least one processor, and at least one memory including computer program code, the at least one memory and the computer program code configured to, with the at least one processor, cause the apparatus to receive purchasing information. The apparatus is also caused to direct a browser application to a script associated with the purchasing information that is used to determine whether a purchasing application is resident and to redirect the purchasing information to the browser application or a messaging application based on the determination.

According to another embodiment, a computer-readable storage medium carrying one or more sequences of one or more instructions which, when executed by one or more processors, cause an apparatus to receive purchasing information. The apparatus is also caused to direct a browser application to a script associated with the purchasing information that is used to determine whether a purchasing application is resident and to redirect the purchasing information to the browser application or a messaging application based on the determination.

According to yet another embodiment, an apparatus comprises means for receiving purchasing information. The method also comprises means for directing a browser application to a script associated with the purchasing information that is used to determine whether a purchasing application is resident and to redirect the purchasing information to the browser application or a messaging application based on the determination.

Still other aspects, features, and advantages of the invention are readily apparent from the following detailed description, simply by illustrating a number of particular embodiments and implementations, including the best mode contemplated for carrying out the invention. The invention is also capable of other and different embodiments, and its several details can be modified in various obvious respects, all without departing from the spirit and scope of the invention. Accordingly, the drawings and description are to be regarded as illustrative in nature, and not as restrictive.

BRIEF DESCRIPTION OF THE DRAWINGS

The embodiments of the invention are illustrated by way of example, and not by way of limitation, in the figures of the accompanying drawings:

FIG. 8 is a diagram of a mobile station (e.g., handset) that can be used to implement an embodiment of the invention.

DESCRIPTION OF PREFERRED EMBODIMENT

A method and apparatus for displaying purchasing information are disclosed. In the following description, for the purpose of explanation, numerous specific details are set forth in order to provide a thorough understanding of the embodiments of the invention. It is apparent, however, to one skilled in the art that the embodiments of the invention may be practiced without these specific details or with an equivalent arrangement. In other instances, well-known structures and devices are shown in block diagram form in order to avoid unnecessarily obscuring the embodiments of the invention.

Although various embodiments are described herein with respect to displaying purchasing information on a mobile device, it is contemplated that the approach described herein may be used with other devices capable of displaying purchasing information including, for example, a fixed device such as a desktop computer, communication terminal, and the like. As used herein, the term "purchasing information" comprises information (e.g., description, pictures, pricing, availability, etc.) related to items available for purchase. For example, these items include applications, services, content, items, and other goods. It is contemplated that purchasing information may also include information related to paying for the items including method of payment (e.g., credit card, telephone account billing, operator billing), account information, and authentication credentials.

Figure 1:
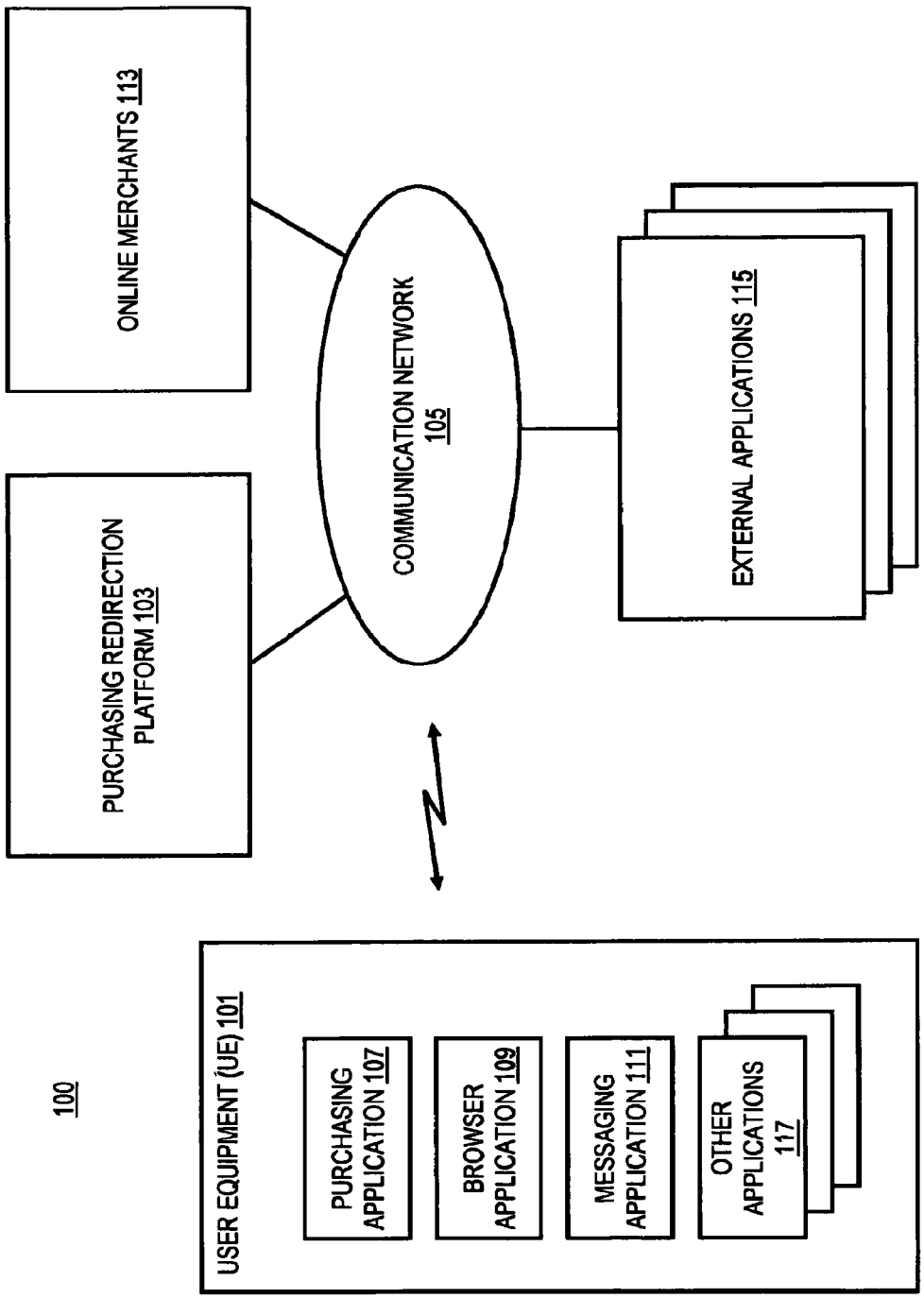
FIG. 1 is a diagram of a system capable of displaying purchasing information, according to one embodiment.

FIG. 1 is a diagram of a system capable of displaying purchasing information, according to one embodiment. As previously discussed, the process of browsing items available for purchase and providing information for purchasing those items can be quite cumbersome when using a mobile device. For example, the limited display area of a typical mobile device may cause a user to have to scroll excessively when viewing a list of items to find an item of interest. The difficulty of locating items on a mobile device can discourage users from engaging in online commerce while using a mobile device. Moreover, once a user finds an item to purchase, entering payment information (e.g., account numbers, method of payment, shipping address, etc.) to complete the transaction can be just as, if not more, tedious than the browsing process.

To address this problem, a system 100 of FIG. 1 enables the transmission of purchasing information to a user's mobile device using, for instance, a link in a short message service (SMS) text message, a multimedia messaging service (MMS) message, electronic mail (E-mail) message, and other similar messaging services. In certain embodiments, the link may also be provided by another application (e.g., when the application suggests an item to purchase). The link includes, for instance, a script that is processed by a browser application on the mobile device to determine whether a purchasing application is installed and resident on the mobile device. In one embodiment, the purchasing application is a standalone application capable of displaying the purchasing information. As a standalone application in the mobile device, the purchasing application can provide, for example, a user interface that is more integrated with the operating system of the mobile device, and therefore easier for the user to use. However, in some cases, the purchasing application may not be available or installed on a particular mobile device. In such a case, the system 100 redirects the purchasing information to be displayed in the browser application or a messaging application (e.g., SMS application, MMS application, E-mail application, instant messaging application) of the mobile device instead of in the purchasing application. In this way, the system 100 can provide a similar user experience for purchasing an item using the browser application or a messaging application that is provided by the purchasing application. More generally, the approach of system 100 enables transmission of specific purchasing information for display on a purchasing application (e.g., to direct users to specific purchasing information that the user may not otherwise discover, or to promote products and services as part of an advertising or marketing campaign) and to redirect that information for display on a browser application or a messaging application if the purchasing application is not present. The system 100 can determine whether to redirect the purchasing application to the browser application or the messaging application based on, for instance, user preference or data network availability.

As shown in FIG. 1, the system 100 comprises a user equipment (UE) 101 having connectivity to a purchasing redirection platform 103 via a communication network 105. The UE 101 is any type of mobile terminal, fixed terminal, or portable terminal including a mobile handset, station, unit, device, multimedia tablet, Internet node, communicator, desktop computer, laptop computer, Personal Digital Assistants (PDAs), or any combination thereof. It is also contemplated that the UE 101 can support any type of interface to the user (such as "wearable" circuitry, etc.). As described above, the purchasing redirection platform 103 transmits purchasing information over the communication network 105 for display on the UE 101 using the purchasing application 107 if installed on the device. If the purchasing application 107 is not installed, the purchasing redirection platform 103 redirects the purchasing information to either the browser application 109 or the messaging application 111. For example, if the purchasing information is redirected to the browser application 109, the user can view the purchasing information and complete a purchase of the items described in the purchasing information using the browser application 109. Similarly, if the purchasing information is directed to the messaging application 111, the purchasing information may be presented as an SMS message, MMS message, or E-mail. In one embodiment, the user can then respond to the message containing the purchasing information to initiate purchase of one or more items described by the purchasing information.

By way of example, the communication network 105 of system 100 includes one or more networks such as a data network (not shown), a wireless network (not shown), a telephony network (not shown), or any combination thereof. It is contemplated that the data network may be any local area network (LAN), metropolitan area network (MAN), wide area network (WAN), the Internet, or any other suitable packet-switched network, such as a commercially owned, proprietary packet-switched network, e.g., a proprietary cable or fiber-optic network. In addition, the wireless network may be, for example, a cellular network and may employ various technologies including enhanced data rates for global evolution (EDGE), general packet radio service (GPRS), global system for mobile communications (GSM), Internet protocol multimedia subsystem (IMS), universal mobile telecommunications system (UMTS), etc., as well as any other suitable wireless medium, e.g., microwave access (WiMAX), Long Term Evolution (LTE) networks, code division multiple access (CDMA), wireless fidelity (WiFi), satellite, mobile ad-hoc network (MANET), and the like.

The purchasing redirection platform 103 and the UE 101 also have connectivity to one or more online merchants 113 through the communication network 105. Typically, the online merchants 113 provide a range of items available for purchase. The online merchants 113 may also include content providers or other service providers (not shown) with access to the communication network 105. In one embodiment, the purchasing redirection platform 103 obtains the purchasing information from one or more of the online merchants 113 for transmission to the UE 101. In addition, the purchasing redirection platform 103 has connectivity to one or more external applications 115 (e.g., a navigation application, a music player) that can provide purchasing information to the purchasing redirection platform 103. For example, a navigation application may provide purchasing information for new maps or maps for other regions. Similarly, a music player may provide purchasing information for songs or other media. It is contemplated that the purchasing redirection platform 103 also has connectivity to other applications 117 running on the UE 101. These applications may perform, for instance, the same functions performed by the external applications 115 (e.g., navigation, music), but are run on the UE 101 (e.g., mobile device) itself The purchasing information from these applications (e.g., external applications 115 and other applications 117) can then be transmitted to the UE 101 by the purchasing redirection platform 103. After transmitting the information, the purchasing redirection platform 103 can direct the information to the purchasing application 107, the browser application 109, or the messaging application 111 depending on the presence of the purchasing application 107. As shown, the purchasing redirection platform 103 is a standalone component on the communication network 105. In addition or alternatively, the purchasing redirection platform 103 may be included in one or more of the online merchants 113, the external applications 115, or the other applications 117.

By way of example, the UE 101, the purchasing redirection platform 103, the online merchants 113, and the external applications 115 communicate with each other and with other components of the communication network 105 using well known, new or still developing protocols. In this context, a protocol includes a set of rules defining how the network nodes within the communication network 105 (e.g., UE 101, purchasing redirection platform 103) interact with each other based on information sent over the communication links. The protocols are effective at different layers of operation within each node, from generating and receiving physical signals of various types, to selecting a link for transferring those signals, to the format of information indicated by those signals, to identifying which software application executing on a computer system sends or receives the information. The conceptually different layers of protocols for exchanging information over a network are described in the Open Systems Interconnection (OSI) Reference Model.

Communications between the network nodes are typically effected by exchanging discrete packets of data. Each packet typically comprises (1) header information associated with a particular protocol, and (2) payload information that follows the header information and contains information that may be processed independently of that particular protocol. In some protocols, the packet includes (3) trailer information following the payload and indicating the end of the payload information. The header includes information such as the source of the packet, its destination, the length of the payload, and other properties used by the protocol. Often, the data in the payload for the particular protocol includes a header and payload for a different protocol associated with a different, higher layer of the OSI Reference Model. The header for a particular protocol typically indicates a type for the next protocol contained in its payload. The higher layer protocol is said to be encapsulated in the lower layer protocol. The headers included in a packet traversing multiple heterogeneous networks, such as the Internet, typically include a physical (layer 1) header, a data-link (layer 2) header, an internetwork (layer 3) header and a transport (layer 4) header, and various application headers (layer 5, layer 6 and layer 7) as defined by the OSI Reference Model.

Figure 2:
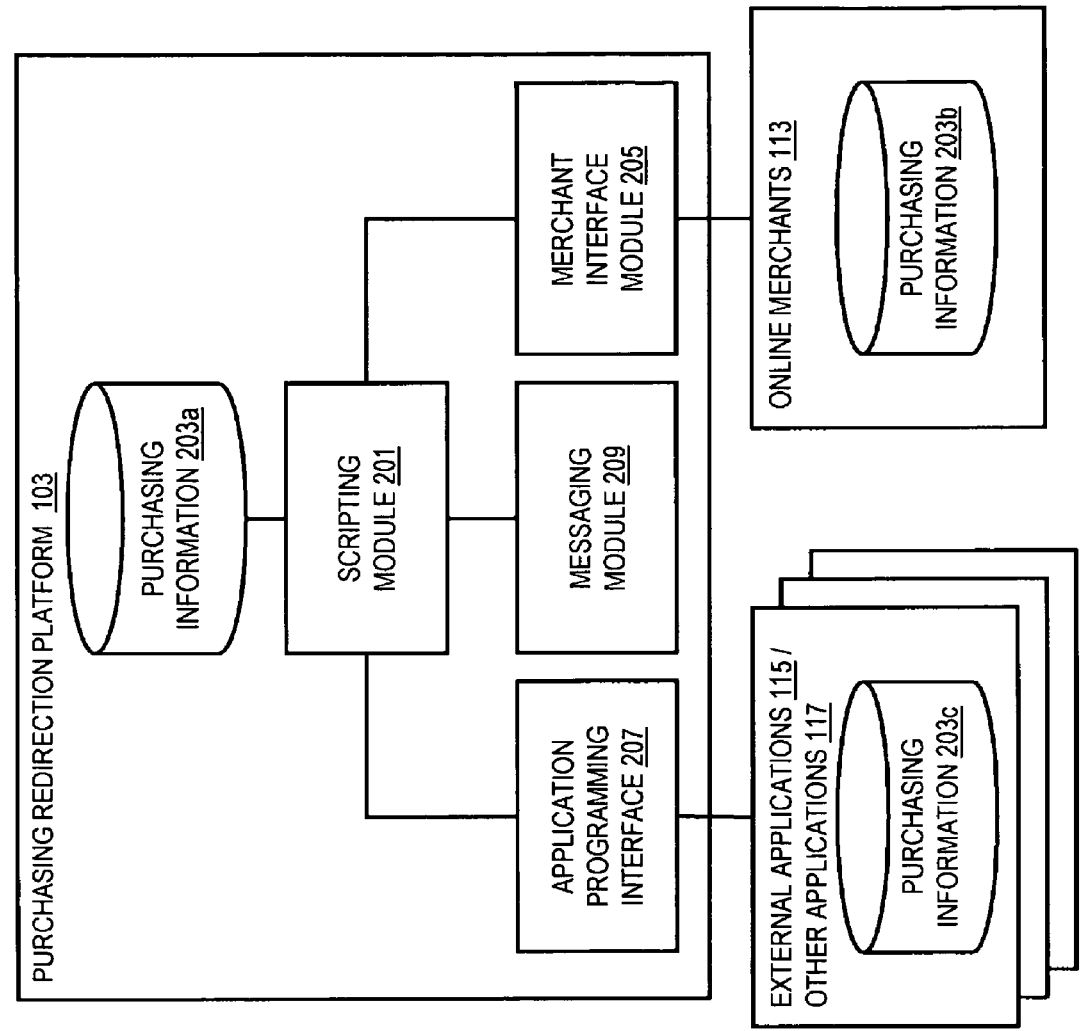
FIG. 2 is a diagram of the components of a purchasing redirection platform, according to one embodiment.

FIG. 2 is a diagram of the components of a purchasing redirection platform, according to one embodiment. By way of example, the purchasing redirection platform 103 includes one or more components for initiating the display and redirection, if necessary, of purchasing information on the UE 101. It is contemplated that the functions of these components may be combined in one or more components or performed by other components of equivalent functionality. In this embodiment, the purchasing redirection platform 103 includes a scripting module 201 for processing purchasing information to generate, for instance, a script including or pointing to purchasing information and redirecting the display of that information if necessary. As used herein, the term "script" is a set of computer instructions to allow control of the transmission and display of the purchasing information on the UE 101. In one embodiment, the script is a server-side script whereby the instructions of the script are executed by a component (e.g., the scripting module 201) on the communication network 105. By way of example, the scripting module 201 may generate the script using a scripting language such as Active Server Pages (ASP) or PHP. It is contemplated that in certain embodiments, the script may be a client-side script whereby the script is run on the device (e.g., the UE 101) that receives the script.

To obtain purchasing information, the scripting module 201 interacts with a database 203a of purchasing information within the purchasing redirection platform 103. The purchasing information database 203a contains information related one or more items available for sale. For example, the database 203a may provide the item name, description, vendor, availability, price, etc. for each item in the database. It is contemplated that the item may include services, applications, goods, content, or a combination thereof available for sale over the communication network 105. In addition or alternatively, the scripting module 201 may obtain purchasing information from a purchasing database 203b associated with one or more online merchants 113 or from a purchasing database 203c associated with one or more external applications 115 or other applications 117.

By way of example, the scripting module 201 interacts with a merchant interface module 205 to access the purchasing information database 203b. The merchant interface module 205 provides access to public or private application programming interfaces (APIs) corresponding to the online merchants 113. In this example, public APIs are those released publicly by the online merchant 113 for access publicly available functions or data provided by the merchant 113. Private APIs are those provided, for instance, for granting private access to certain functions and data of the online merchant 113. For example, private APIs are typically exchanged through mutual agreement between the online merchant 113 and the provider of the purchasing redirection platform 103.

Similarly, the scripting module 201 interacts with the purchasing information database 203c of the external applications 115 using an API 207 of the purchasing information platform 103. In this embodiment, the API 207 provides the external applications 115 and other applications 117 access to the functions of the purchasing redirection platform 103. In this way, the external applications 115 and other applications 117 may direct the scripting module 201 to transmit purchasing information related to the external applications 115 and other applications 117. As described previously, a navigation application may, for instance, direct the scripting module 201 to transmit purchasing information related to new maps for use in the navigation application.

After generating the script including or pointing to the purchasing information obtained from the purchasing redirection platform 103, the online merchants 113, the external applications 115, the other applications 117, or a combination thereof, the scripting module 201 directs the messaging module 209 to transmit the script to the UE 101. By way of example, the messaging module 209 can transmit the script using any messaging service available to the UE 101 including SMS, MMS, E-mail, or a combination thereof In one embodiment, the script is transmitted as a link within the transmitted message (e.g., SMS message, MMS message, E-mail message, instant messaging message such as Extensible Messaging and Presence Protocol (XMPP) message). If the purchasing information is provided by an application (e.g., external applications 115 or other applications 117), the application may provide the link directly to the UE 101 via application processes or via the purchasing redirection platform 103 using the API 207.

Figure 3:
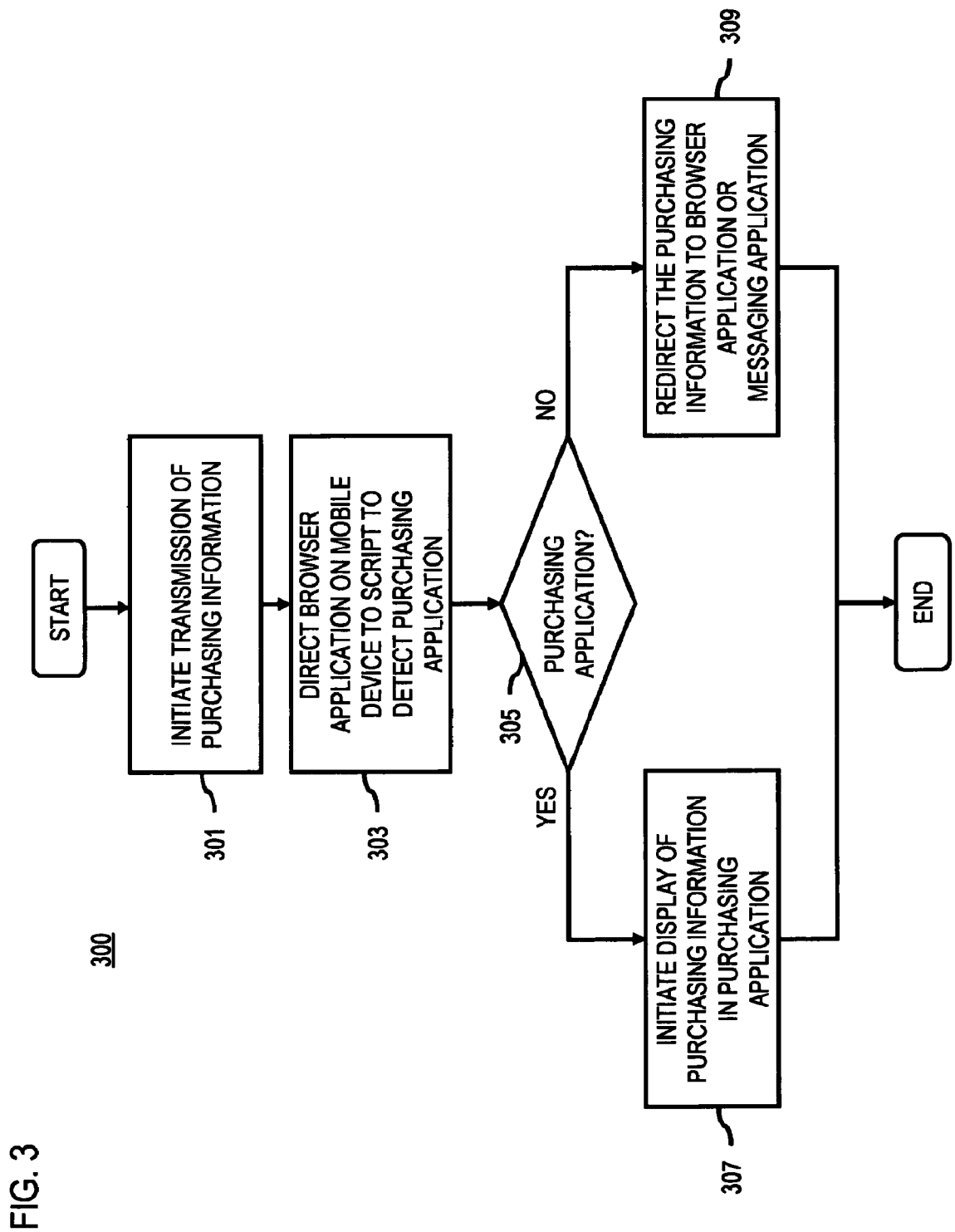
FIG. 3 is a flowchart of a process for initiating the display of purchasing information, according to one embodiment.

FIG. 3 is a flowchart of a process for initiating the display of purchasing information, according to one embodiment. In one embodiment, the purchasing redirection platform 103 performs the process 300 and is implemented in, for instance, a chip set including a processor and a memory as shown FIG. 7. In step 301, the purchasing redirection platform 103 initiates transmission of purchasing information to be presented on a mobile device (e.g., the UE 101). As discussed with respect to FIG. 2, the platform 103 can initiate transmission of the purchasing information as a link in an SMS message, MMS message, E-mail message, instant messaging message such as Extensible Messaging and Presence Protocol (XMPP) message, or a combination thereof Additionally, an application (e.g., external applications 115 or other applications 117) may provide the purchasing information directly or via the platform 103 using, for instance, the API 207.

The purchasing redirection platform 103 then determines whether a purchasing application 107 is resident on the mobile device (step 303). In one embodiment, the determination is made by directing the browser application 109 within the mobile device to access a script associated with the purchasing information. For example, the script is provided with the link transmitted by the platform 103 or an external application (e.g., external application 115 or other application 117). On accessing the script using the browser application 109, the script detects whether the purchasing application 107 is installed on the mobile device (step 305).

If the purchasing application 107 is installed or resident on the mobile device, the purchasing redirection platform 103 initiates display of the purchasing information in the purchasing application 107 (step 307). In one embodiment, the process of displaying the purchasing information includes launching the purchasing application 107. The launch of the purchasing application 107 can be initiated, for instance, using a command in the script associated with the purchasing information. After launching the purchasing application 107, the purchasing information may direct the purchasing application 107 to display a specific view such as a purchasing category (e.g., a category of "books," or a category of recommended content based on user preferences or purchasing history), a purchasing channel (e.g., a collection of items designated by, for instance, an online merchant 113), a purchase item (e.g., a song, other media content, an application, goods, a service, etc.), or a combination thereof If the purchasing application 107 is not present, the purchasing redirection platform 103 redirects the purchasing information to the browser application 109 or the messaging application 111 for display. For example, the purchasing redirection platform 103 directs the browser to an Extensible HyperText Markup Language (XHTML) version of the purchasing information. As discussed previously, the purchasing redirection platform 103 can also transmit the purchasing information to the messaging application 109 in an SMS message, MMS message, E-mail message, and/or instant message. By way of example, the purchasing redirection platform 103 determines whether to redirect the purchasing information to the browser application 109 or the messaging application based on user preference or other criteria such as networking availability or traffic. For example, the user may configure the purchasing redirection platform 103 to redirect the purchasing information to either the browser application 109 or the messaging application 111. In other embodiments, the purchasing redirection platform 103 can determine whether the UE 101 has connectivity to the data network within the communication network 105 to support a browser session for display of the purchasing information. If not, the purchasing redirection platform 103 redirects the purchasing information to the messaging application 111. In this way, the purchasing redirection platform 103 can direct a user to specific purchasing information even when the user's mobile device does not have the purchasing application 107 installed. This approach advantageously enables the user to discover new purchasing information while reducing the burden of viewing a large catalog of purchase items on the limited display of a mobile device.

Figure 4:
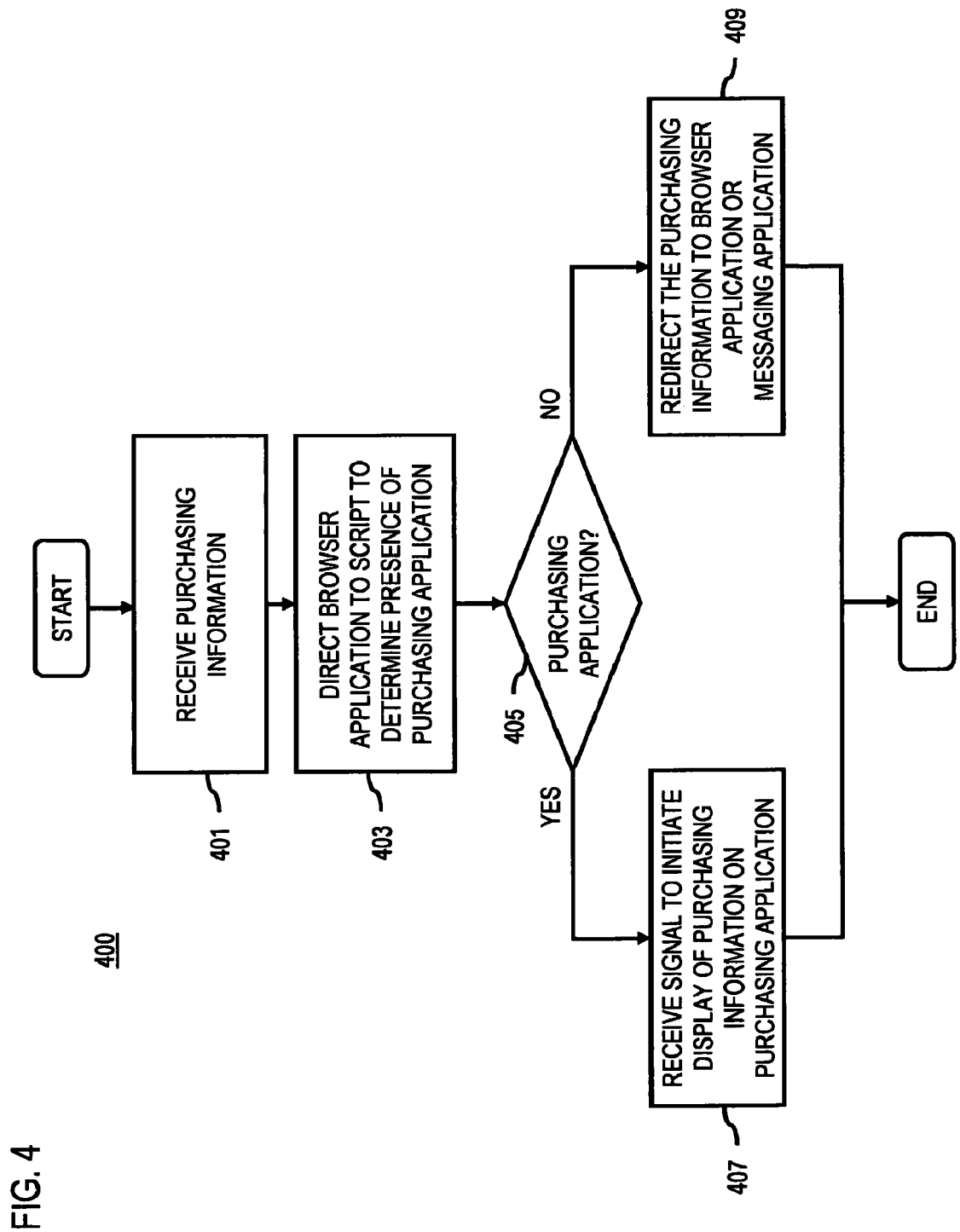
FIG. 4 is a flowchart of a process for receiving purchasing information for display, according to one embodiment.

FIG. 4 is a flowchart of a process for receiving purchasing information for display, according to one embodiment. In one embodiment, the process 400 is performed within the UE 101 and is implemented in, for instance, a chip set including a processor and a memory as shown FIG. 7. In step 401, the UE 101 receives purchasing information transmitted from the purchasing redirection platform 103. In one embodiment, the purchasing information is received as a link in an SMS message, MMS message, E-mail message, instant messaging message such as Extensible Messaging and Presence Protocol (XMPP) message, or a combination thereof transmitted from the platform 103. In addition or alternatively, the UE 101 may receive the purchasing information from an application (e.g., external applications 115 and other applications 117). The browser is then directed to a script associated with the purchasing information that is used to determine whether the purchasing application 107 is resident or installed on the mobile device (steps 403 and 405).

The script operates as described with respect to FIG. 3. Specifically, if the purchasing application 107 is present, the UE 101 receives a signal from the purchasing redirection platform 103 to initiate display of the purchasing information in the purchasing application 107 (step 407). The signal, for instance, may be triggered by the script or may be initiated by the purchasing redirection platform 103 as additional purchasing information transmitted to the purchasing application 107. In other embodiments, the signal comprises the act of forwarding the purchasing information to the purchasing application 107 by the script or the browser application 109. If the purchasing application 107 is not present, the purchasing information is redirected to the browser application 109 or the messaging application 111 as described above to provide the same or similar user interface and user experience as provided by the purchasing application 107 (step 409).

Figure 5B:
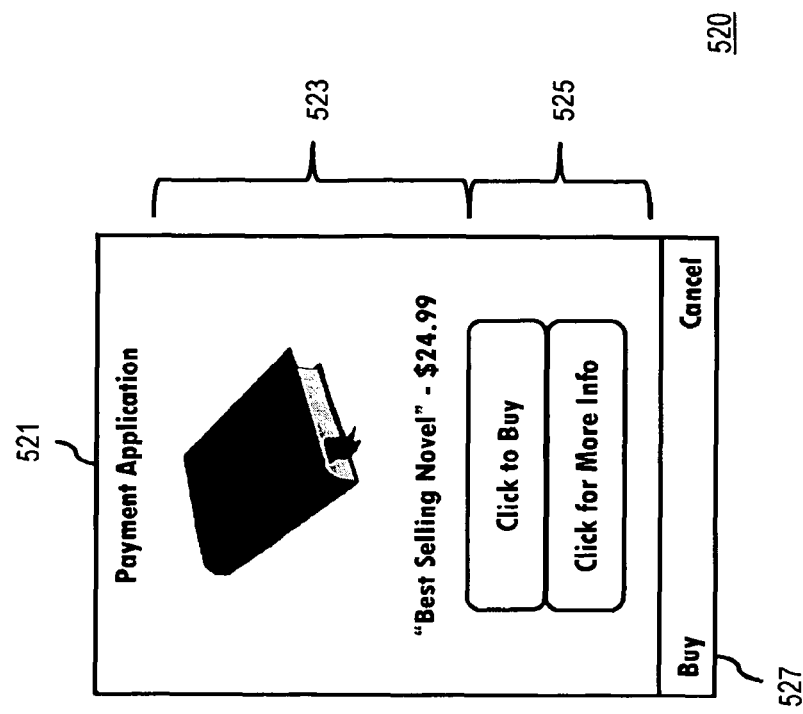
FIGS. 5A and 5B are diagrams of user interfaces utilized in the processes of FIGS. 3 and 4, according to various embodiments.
Figure 5A:
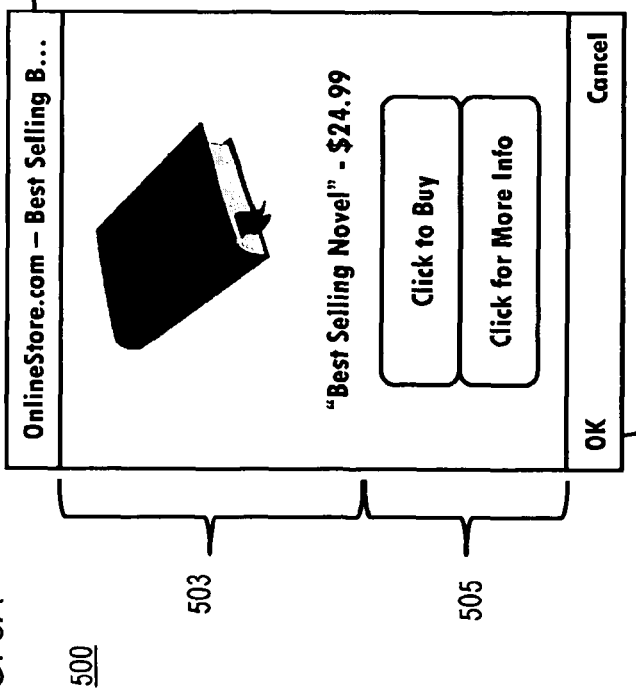

FIGS. 5A and 5B are diagrams of user interfaces utilized in the processes of FIGS. 3 and 4, according to various embodiments. FIG. 5A depicts a user interface 500 for displaying purchasing information using the browser application 109. In this example, the purchasing application 107 is not resident on the UE 101, and the purchasing information has been redirected for display on the browser application 109. For example, the purchasing information directs the browser application 109 to display a specific view depicting a novel available for purchase. The purchasing information, for instance, was transmitted to the UE 101 as part of a marketing campaign. As shown, user interface 500 includes an address bar 501 for displaying the web address of the displayed purchasing information. The user interface 500 also includes a descriptive section 503 for displaying information related to the novel such as a picture of the book's cover, title, and price. To buy the book or to obtain more information about the book, the user can select one or the commands displayed in the action section 505 and then select the "OK" option 507.

FIG. 5B depicts a user interface 520 for displaying purchasing information using the purchasing application 107. In this example, the purchasing redirection platform 103 has determined that the purchasing application 107 is resident on the UE 101. Accordingly, the platform 103 has initiated the display of the purchasing information on the purchasing application 107. As shown, the user interface 520 is very similar to the user interface 500 even though the user interface 520 is displayed by the purchasing application 107 whereas the user interface 500 is displayed by the browser application 109. The similarity of the two user interfaces 500 and 520 enables the purchasing redirection platform 103 to provide a consistent user interface and user experience even when the purchasing application 107 is not installed in the UE 101. Overall, there are only minor differences between the two screens because of, for instance, the different applications used to display the purchasing information. For example, the title 521 of user interface 520 is different than the address bar 501 of the user interface 500. Otherwise, the description section 523 displays information identical to the description section 503 of user interface 500. The commands of the action section 525 are also the same as the commands of the action section 505 of user interface 500. The only other difference in this example is that the user interface screen 520 includes a buy command 527 rather than an "OK" option 507. This difference can arise because typically, a standalone application such as the purchasing application 107 provides greater programmability of system keys and menu items than provided by the browser application 109. However, it is contemplated that in certain embodiments, each element of the user interfaces 500 and 520 can be made to be identical so that the end user is not aware of which application (e.g., either the browser application 109 or the purchasing application 107) is being used to display the purchasing information.

The processes described herein for displaying purchasing information may be advantageously implemented via software, hardware (e.g., general processor, Digital Signal Processing (DSP) chip, an Application Specific Integrated Circuit (ASIC), Field Programmable Gate Arrays (FPGAs), etc.), firmware or a combination thereof Such exemplary hardware for performing the described functions is detailed below.

Figure 6:
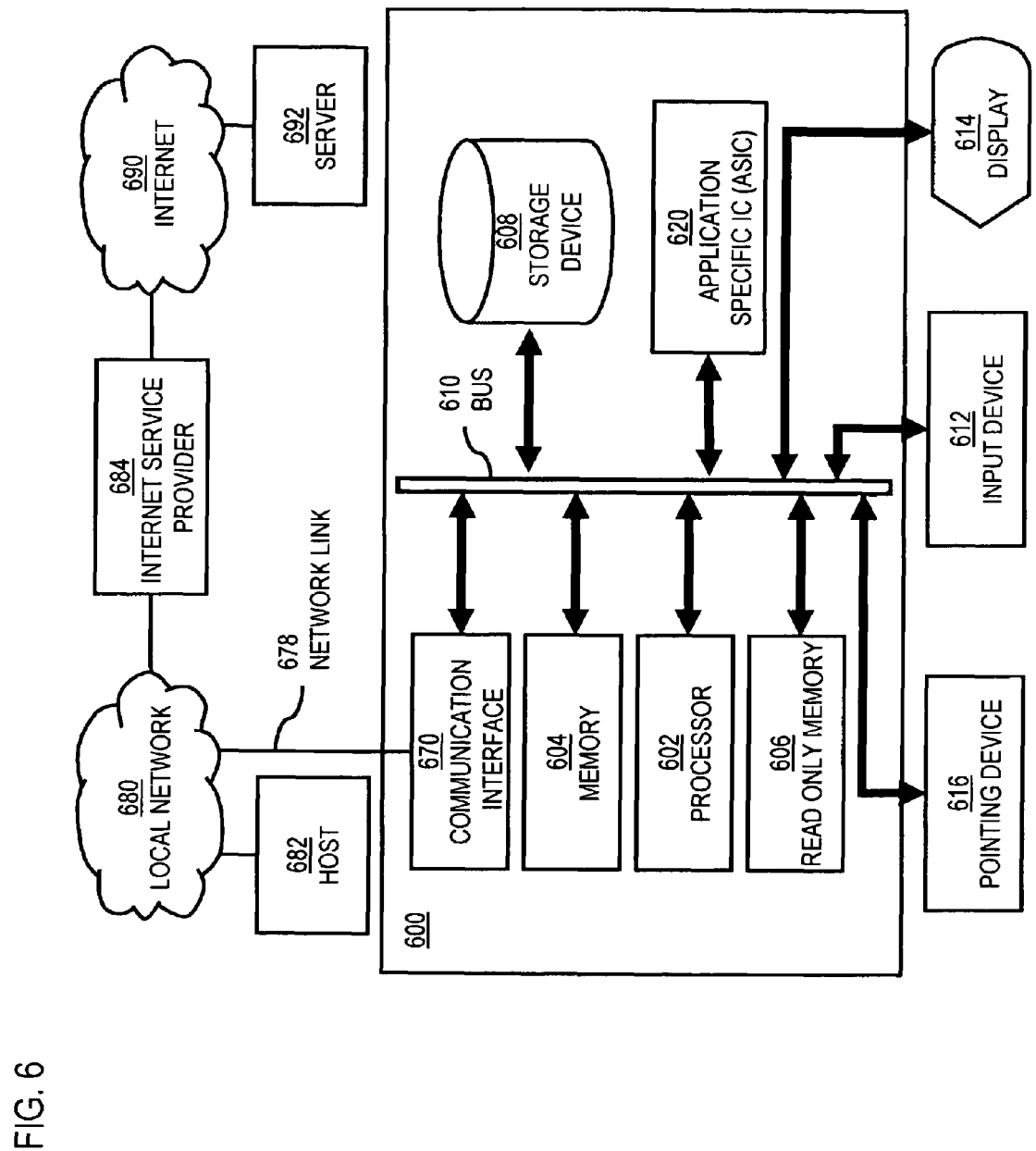
FIG. 6 is a diagram of hardware that can be used to implement an embodiment of the invention.

FIG. 6 illustrates a computer system 600 upon which an embodiment of the invention may be implemented. Computer system 600 is programmed (e.g., via computer program code or instructions) to display purchasing information as described herein and includes a communication mechanism such as a bus 610 for passing information between other internal and external components of the computer system 600. Information (also called data) is represented as a physical expression of a measurable phenomenon, typically electric voltages, but including, in other embodiments, such phenomena as magnetic, electromagnetic, pressure, chemical, biological, molecular, atomic, sub-atomic and quantum interactions. For example, north and south magnetic fields, or a zero and non-zero electric voltage, represent two states (0, 1) of a binary digit (bit). Other phenomena can represent digits of a higher base. A superposition of multiple simultaneous quantum states before measurement represents a quantum bit (qubit). A sequence of one or more digits constitutes digital data that is used to represent a number or code for a character. In some embodiments, information called analog data is represented by a near continuum of measurable values within a particular range.

A bus 610 includes one or more parallel conductors of information so that information is transferred quickly among devices coupled to the bus 610. One or more processors 602 for processing information are coupled with the bus 610.

A processor 602 performs a set of operations on information as specified by computer program code related to display purchasing information. The computer program code is a set of instructions or statements providing instructions for the operation of the processor and/or the computer system to perform specified functions. The code, for example, may be written in a computer programming language that is compiled into a native instruction set of the processor. The code may also be written directly using the native instruction set (e.g., machine language). The set of operations include bringing information in from the bus 610 and placing information on the bus 610. The set of operations also typically include comparing two or more units of information, shifting positions of units of information, and combining two or more units of information, such as by addition or multiplication or logical operations like OR, exclusive OR (XOR), and AND. Each operation of the set of operations that can be performed by the processor is represented to the processor by information called instructions, such as an operation code of one or more digits. A sequence of operations to be executed by the processor 602, such as a sequence of operation codes, constitute processor instructions, also called computer system instructions or, simply, computer instructions. Processors may be implemented as mechanical, electrical, magnetic, optical, chemical or quantum components, among others, alone or in combination.

Computer system 600 also includes a memory 604 coupled to bus 610. The memory 604, such as a random access memory (RAM) or other dynamic storage device, stores information including processor instructions for displaying purchasing information. Dynamic memory allows information stored therein to be changed by the computer system 600. RAM allows a unit of information stored at a location called a memory address to be stored and retrieved independently of information at neighboring addresses. The memory 604 is also used by the processor 602 to store temporary values during execution of processor instructions. The computer system 600 also includes a read only memory (ROM) 606 or other static storage device coupled to the bus 610 for storing static information, including instructions, that is not changed by the computer system 600. Some memory is composed of volatile storage that loses the information stored thereon when power is lost. Also coupled to bus 610 is a non-volatile (persistent) storage device 608, such as a magnetic disk, optical disk or flash card, for storing information, including instructions, that persists even when the computer system 600 is turned off or otherwise loses power.

Information, including instructions for displaying purchasing information, is provided to the bus 610 for use by the processor from an external input device 612, such as a keyboard containing alphanumeric keys operated by a human user, or a sensor. A sensor detects conditions in its vicinity and transforms those detections into physical expression compatible with the measurable phenomenon used to represent information in computer system 600. Other external devices coupled to bus 610, used primarily for interacting with humans, include a display device 614, such as a cathode ray tube (CRT) or a liquid crystal display (LCD), or plasma screen or printer for presenting text or images, and a pointing device 616, such as a mouse or a trackball or cursor direction keys, or motion sensor, for controlling a position of a small cursor image presented on the display 614 and issuing commands associated with graphical elements presented on the display 614. In some embodiments, for example, in embodiments in which the computer system 600 performs all functions automatically without human input, one or more of external input device 612, display device 614 and pointing device 616 is omitted.

In the illustrated embodiment, special purpose hardware, such as an application specific integrated circuit (ASIC) 620, is coupled to bus 610. The special purpose hardware is configured to perform operations not performed by processor 602 quickly enough for special purposes. Examples of application specific ICs include graphics accelerator cards for generating images for display 614, cryptographic boards for encrypting and decrypting messages sent over a network, speech recognition, and interfaces to special external devices, such as robotic arms and medical scanning equipment that repeatedly perform some complex sequence of operations that are more efficiently implemented in hardware.

Computer system 600 also includes one or more instances of a communications interface 670 coupled to bus 610. Communication interface 670 provides a one-way or two-way communication coupling to a variety of external devices that operate with their own processors, such as printers, scanners and external disks. In general the coupling is with a network link 678 that is connected to a local network 680 to which a variety of external devices with their own processors are connected. For example, communication interface 670 may be a parallel port or a serial port or a universal serial bus (USB) port on a personal computer. In some embodiments, communications interface 670 is an integrated services digital network (ISDN) card or a digital subscriber line (DSL) card or a telephone modem that provides an information communication connection to a corresponding type of telephone line. In some embodiments, a communication interface 670 is a cable modem that converts signals on bus 610 into signals for a communication connection over a coaxial cable or into optical signals for a communication connection over a fiber optic cable. As another example, communications interface 670 may be a local area network (LAN) card to provide a data communication connection to a compatible LAN, such as Ethernet. Wireless links may also be implemented. For wireless links, the communications interface 670 sends or receives or both sends and receives electrical, acoustic or electromagnetic signals, including infrared and optical signals, that carry information streams, such as digital data. For example, in wireless handheld devices, such as mobile telephones like cell phones, the communications interface 670 includes a radio band electromagnetic transmitter and receiver called a radio transceiver. In certain embodiments, the communications interface 670 enables connection to the communication network 105 for transmitting purchasing and redirecting the display of that information on the UE 101.

The term computer-readable medium is used herein to refer to any medium that participates in providing information to processor 602, including instructions for execution. Such a medium may take many forms, including, but not limited to, non-volatile media, volatile media and transmission media. Non-volatile media include, for example, optical or magnetic disks, such as storage device 608. Volatile media include, for example, dynamic memory 604. Transmission media include, for example, coaxial cables, copper wire, fiber optic cables, and carrier waves that travel through space without wires or cables, such as acoustic waves and electromagnetic waves, including radio, optical and infrared waves. Signals include man-made transient variations in amplitude, frequency, phase, polarization or other physical properties transmitted through the transmission media. Common forms of computer-readable media include, for example, a floppy disk, a flexible disk, hard disk, magnetic tape, any other magnetic medium, a CD-ROM, CDRW, DVD, any other optical medium, punch cards, paper tape, optical mark sheets, any other physical medium with patterns of holes or other optically recognizable indicia, a RAM, a PROM, an EPROM, a FLASH-EPROM, any other memory chip or cartridge, a carrier wave, or any other medium from which a computer can read.

Figure 7:
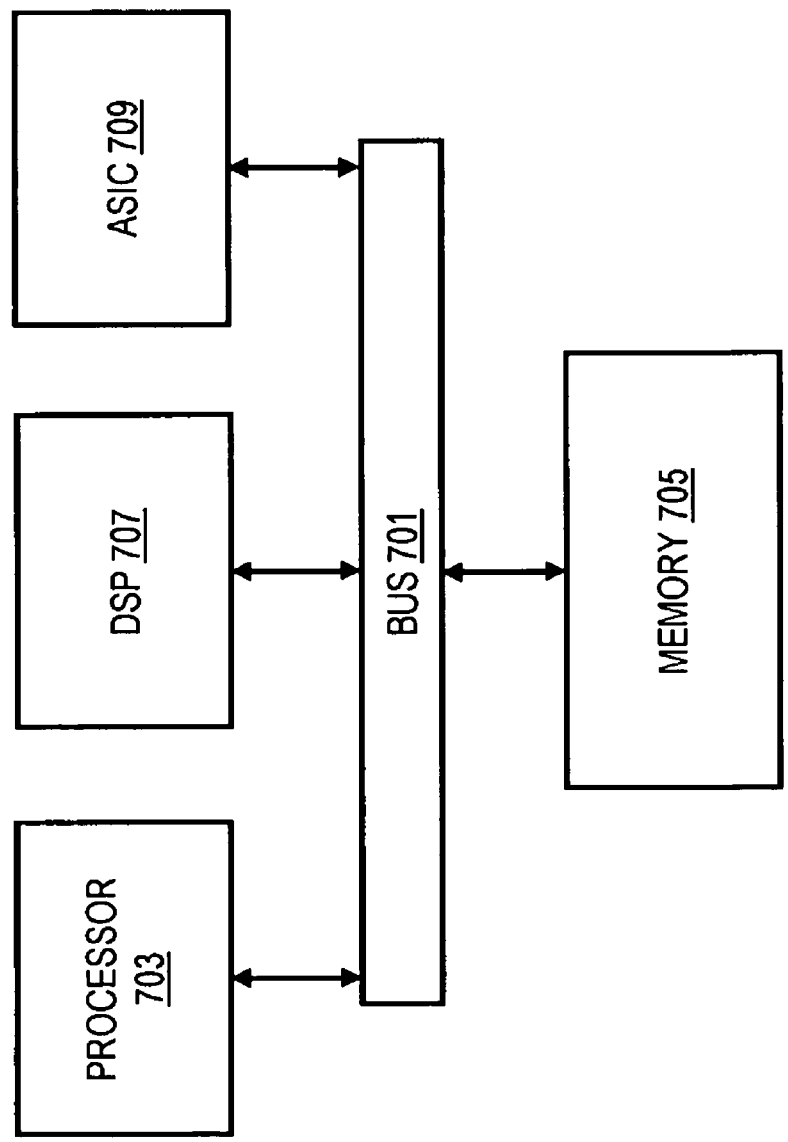
FIG. 7 is a diagram of a chip set that can be used to implement an embodiment of the invention.

FIG. 7 illustrates a chip set 700 upon which an embodiment of the invention may be implemented. Chip set 700 is programmed to display purchasing information as described herein and includes, for instance, the processor and memory components described with respect to FIG. 6 incorporated in one or more physical packages (e.g., chips). By way of example, a physical package includes an arrangement of one or more materials, components, and/or wires on a structural assembly (e.g., a baseboard) to provide one or more characteristics such as physical strength, conservation of size, and/or limitation of electrical interaction. It is contemplated that in certain embodiments the chip set can be implemented in a single chip.

In one embodiment, the chip set 700 includes a communication mechanism such as a bus 701 for passing information among the components of the chip set 700. A processor 703 has connectivity to the bus 701 to execute instructions and process information stored in, for example, a memory 705. The processor 703 may include one or more processing cores with each core configured to perform independently. A multi-core processor enables multiprocessing within a single physical package. Examples of a multi-core processor include two, four, eight, or greater numbers of processing cores. Alternatively or in addition, the processor 703 may include one or more microprocessors configured in tandem via the bus 701 to enable independent execution of instructions, pipelining, and multithreading. The processor 703 may also be accompanied with one or more specialized components to perform certain processing functions and tasks such as one or more digital signal processors (DSP) 707, or one or more application-specific integrated circuits (ASIC) 709. A DSP 707 typically is configured to process real-world signals (e.g., sound) in real time independently of the processor 703. Similarly, an ASIC 709 can be configured to performed specialized functions not easily performed by a general purposed processor. Other specialized components to aid in performing the inventive functions described herein include one or more field programmable gate arrays (FPGA) (not shown), one or more controllers (not shown), or one or more other special-purpose computer chips.

The processor 703 and accompanying components have connectivity to the memory 705 via the bus 701. The memory 705 includes both dynamic memory (e.g., RAM, magnetic disk, writable optical disk, etc.) and static memory (e.g., ROM, CD-ROM, etc.) for storing executable instructions that when executed perform the inventive steps described herein to display purchasing information. The memory 705 also stores the data associated with or generated by the execution of the inventive steps.

FIG. 8 is a diagram of exemplary components of a mobile station (e.g., handset) capable of operating in the system of FIG. 1, according to one embodiment. Generally, a radio receiver is often defined in terms of front-end and back-end characteristics. The front-end of the receiver encompasses all of the Radio Frequency (RF) circuitry whereas the back-end encompasses all of the base-band processing circuitry. Pertinent internal components of the telephone include a Main Control Unit (MCU) 803, a Digital Signal Processor (DSP) 805, and a receiver/transmitter unit including a microphone gain control unit and a speaker gain control unit. A main display unit 807 provides a display to the user in support of various applications and mobile station functions that offer automatic contact matching. An audio function circuitry 809 includes a microphone 811 and microphone amplifier that amplifies the speech signal output from the microphone 811. The amplified speech signal output from the microphone 811 is fed to a coder/decoder (CODEC) 813.

A radio section 815 amplifies power and converts frequency in order to communicate with a base station, which is included in a mobile communication system, via antenna 817. The power amplifier (PA) 819 and the transmitter/modulation circuitry are operationally responsive to the MCU 803, with an output from the PA 819 coupled to the duplexer 821 or circulator or antenna switch, as known in the art. The PA 819 also couples to a battery interface and power control unit 820.

In use, a user of mobile station 801 speaks into the microphone 811 and his or her voice along with any detected background noise is converted into an analog voltage. The analog voltage is then converted into a digital signal through the Analog to Digital Converter (ADC) 823. The control unit 803 routes the digital signal into the DSP 805 for processing therein, such as speech encoding, channel encoding, encrypting, and interleaving. In one embodiment, the processed voice signals are encoded, by units not separately shown, using a cellular transmission protocol such as global evolution (EDGE), general packet radio service (GPRS), global system for mobile communications (GSM), Internet protocol multimedia subsystem (IMS), universal mobile telecommunications system (UMTS), etc., as well as any other suitable wireless medium, e.g., microwave access (WiMAX), Long Term Evolution (LTE) networks, code division multiple access (CDMA), wireless fidelity (WiFi), satellite, and the like.

The encoded signals are then routed to an equalizer 825 for compensation of any frequency-dependent impairments that occur during transmission though the air such as phase and amplitude distortion. After equalizing the bit stream, the modulator 827 combines the signal with a RF signal generated in the RF interface 829. The modulator 827 generates a sine wave by way of frequency or phase modulation. In order to prepare the signal for transmission, an up-converter 831 combines the sine wave output from the modulator 827 with another sine wave generated by a synthesizer 833 to achieve the desired frequency of transmission. The signal is then sent through a PA 819 to increase the signal to an appropriate power level. In practical systems, the PA 819 acts as a variable gain amplifier whose gain is controlled by the DSP 805 from information received from a network base station. The signal is then filtered within the duplexer 821 and optionally sent to an antenna coupler 835 to match impedances to provide maximum power transfer. Finally, the signal is transmitted via antenna 817 to a local base station. An automatic gain control (AGC) can be supplied to control the gain of the final stages of the receiver. The signals may be forwarded from there to a remote telephone which may be another cellular telephone, other mobile phone or a land-line connected to a Public Switched Telephone Network (PSTN), or other telephony networks.

Voice signals transmitted to the mobile station 801 are received via antenna 817 and immediately amplified by a low noise amplifier (LNA) 837. A down-converter 839 lowers the carrier frequency while the demodulator 841 strips away the RF leaving only a digital bit stream. The signal then goes through the equalizer 825 and is processed by the DSP 805. A Digital to Analog Converter (DAC) 843 converts the signal and the resulting output is transmitted to the user through the speaker 845, all under control of a Main Control Unit (MCU) 803—which can be implemented as a Central Processing Unit (CPU) (not shown).

The MCU 803 receives various signals including input signals from the keyboard 847. The keyboard 847 and/or the MCU 803 in combination with other user input components (e.g., the microphone 811) comprise a user interface circuitry for managing user input. The MCU 803 runs a user interface software to facilitate user control of at least some functions of the mobile station 801 to display purchasing information. The MCU 803 also delivers a display command and a switch command to the display 807 and to the speech output switching controller, respectively. Further, the MCU 803 exchanges information with the DSP 805 and can access an optionally incorporated SIM card 849 and a memory 851. In addition, the MCU 803 executes various control functions required of the station. The DSP 805 may, depending upon the implementation, perform any of a variety of conventional digital processing functions on the voice signals. Additionally, DSP 805 determines the background noise level of the local environment from the signals detected by microphone 811 and sets the gain of microphone 811 to a level selected to compensate for the natural tendency of the user of the mobile station 801.

The CODEC 813 includes the ADC 823 and DAC 843. The memory 851 stores various data including call incoming tone data and is capable of storing other data including music data received via, e.g., the global Internet. The software module could reside in RAM memory, flash memory, registers, or any other form of writable storage medium known in the art. The memory device 851 may be, but not limited to, a single memory, CD, DVD, ROM, RAM, EEPROM, optical storage, or any other non-volatile storage medium capable of storing digital data.

An optionally incorporated SIM card 849 carries, for instance, important information, such as the cellular phone number, the carrier supplying service, subscription details, and security information. The SIM card 849 serves primarily to identify the mobile station 801 on a radio network. The card 849 also contains a memory for storing a personal telephone number registry, text messages, and user specific mobile station settings.

While the invention has been described in connection with a number of embodiments and implementations, the invention is not so limited but covers various obvious modifications and equivalent arrangements, which fall within the purview of the appended claims. Although features of the invention are expressed in certain combinations among the claims, it is contemplated that these features can be arranged in any combination and order.

What is claimed is:

1. A method comprising:
  initiating transmission, via a processor, of purchasing information to be presented on a mobile device;
  directing a browser application to access a script that is used to determine whether a purchasing application is resident on the mobile device and to initiate launching of the purchasing application;
  determining by the processor whether the purchasing application is resident on the mobile device; and
  redirecting via the processor the purchasing information to one of the browser application and a messaging application on the mobile device, based on the determination of whether the purchasing application is resident on the mobile device.

2. A method of claim 1, further comprising:
  initiating display of the purchasing information in the purchasing application if the purchasing application is resident on the mobile device.

3. A method of claim 1, wherein the script is a server-side script.

4. A method of claim 1, wherein the purchasing information specifies a purchasing category, channel, item, or a combination thereof for display.

5. A method of claim 1, wherein the information is either transmitted as a link in a text message, multimedia message, electronic mail message, or a combination thereof; or provided by an application.

6. An apparatus comprising:
  at least one processor; and
  at least one memory including computer program code,
  the at least one memory and the computer program code configured to, with the at least one processor, cause the apparatus to perform at least the following,
    initiate transmission of purchasing information to be presented on a mobile device, direct a browser application to access a script that is used to determine whether a purchasing application is present on the mobile device and to initiate launching of the purchasing application,
    determine whether the purchasing application is resident on the mobile device, and
    redirect the purchasing information to one of the browser application and a messaging application on the mobile device, based on the determination of whether the purchasing application is resident on the mobile device.

7. An apparatus of claim 6, wherein the apparatus is further caused to:
  initiate display of the purchasing information in the purchasing application if the purchasing application is resident on the mobile device.

8. An apparatus of claim 6, wherein the script is a server-side script.

9. An apparatus of claim 6, wherein the purchasing information specifies a purchasing category, channel, item, or a combination thereof for display.

10. An apparatus of claim 6, wherein the information is either transmitted as a link in a text message, multimedia message, electronic mail message, or a combination thereof; or provided by an application.

11. A method comprising:
  receiving via a processor purchasing information;
  directing by the processor a browser application to a script associated with the purchasing information that is used to determine whether a purchasing application is resident on a mobile device and to initiate launching of the purchasing application; and
  redirecting via the processor the purchasing information to one of the browser application and a messaging application, based on the determination as to whether the purchasing application is resident on the mobile device.

12. A method of claim 11, wherein the script is a server-side script.

13. A method of claim 11, further comprising:
  receiving a signal for initiating display of the purchasing information in the purchasing application if the purchasing application is resident.

14. A method of claim 11, wherein the purchasing information specifies a purchasing category, channel, content, item, or a combination thereof, and wherein the purchasing information is either transmitted as a link in a text message, multimedia message, electronic mail message, or a combination thereof; or provided by an application.

15. An apparatus comprising:
  at least one processor; and
  at least one memory including computer program code,
  the at least one memory and the computer program code configured to, with the at least one processor, cause the apparatus to perform at least the following,
    receive purchasing information,
    direct a browser application to a script associated with the purchasing information that is used to determine whether a purchasing application is resident and to initiate launching of the purchasing application; and
    redirect the purchasing information to one of the browser application and a messaging application based on the determination as to whether the purchasing application is resident.

16. An apparatus of claim 15, wherein the apparatus is further caused to:
  receive a signal for initiating display of the purchasing information in the purchasing application if the purchasing application is resident.

17. An apparatus of claim 15, wherein the purchasing information specifies a purchasing category, channel, item, or a combination thereof for display, and wherein the purchasing information is either transmitted as a link in a text message, multimedia message, electronic mail message, or a combination thereof; or provided by an application.

18. An apparatus of claim 15, wherein the apparatus is a mobile phone further comprising:
  user interface circuitry and user interface software configured to facilitate user control of at least some functions of the mobile phone through use of a display and further configured to respond to user input; and
  a display and display circuitry configured to display at least a portion of a user interface of the mobile phone and further configured to facilitate user control of at least some functions of the mobile phone.

* * * * *